(12) United States Patent
Lindberg et al.

(10) Patent No.: US 10,552,789 B2
(45) Date of Patent: Feb. 4, 2020

(54) STORE WORKLOAD MANAGER

(71) Applicant: Target Brands, Inc., Minneapolis, MN (US)

(72) Inventors: John Edward Lindberg, Arden Hills, MN (US); Ramesh Thennadil, Minneapolis, MN (US); Thomas Fitzgerald Jenny, Frederic, WI (US); Patrick McLeash Brinton, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 459 days.

(21) Appl. No.: 15/401,587

(22) Filed: Jan. 9, 2017

(65) Prior Publication Data

US 2018/0197134 A1    Jul. 12, 2018

(51) Int. Cl.
*G06Q 10/08* (2012.01)

(52) U.S. Cl.
CPC ................... *G06Q 10/087* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 6,609,101 B1 | 8/2003 | Landvater | |
| 7,240,027 B2 | 7/2007 | McConnell et al. | |
| 7,475,024 B1 * | 1/2009 | Phan | G06Q 10/087 705/22 |
| 7,711,768 B1 * | 5/2010 | Hamilton | G06Q 10/10 370/229 |
| 8,321,303 B1 | 11/2012 | Krishnamurthy et al. | |
| 2002/0072988 A1 * | 6/2002 | Aram | G06Q 10/087 705/26.1 |
| 2007/0061210 A1 * | 3/2007 | Chen | G06Q 10/087 705/22 |

(Continued)

FOREIGN PATENT DOCUMENTS

WO    2016019084 A1    2/2016
WO    2016109251 A1    7/2016

OTHER PUBLICATIONS

Store Replenishment Collaboration Business Process Guide, VICS Collaborative Planning, Forecasting and Replenishmnet (CPFR), pp. 1-31, 2005.

*Primary Examiner* — Scott A Zare
(74) *Attorney, Agent, or Firm* — Westman, Champlin & Koehler, P.A.; Theodore M. Magee

(57) ABSTRACT

A method receives store inventory batch updates from a plurality of retail stores and divides each batch update into a stream of smaller messages, each smaller message referring only to a single product and including the identifier for the retail store, the identifier for the product, the quantity of the product on the sales floor of the retail store and the quantity of the product in the backroom of the retail store. The stream of smaller messages are applied to parallel processing such that a plurality of smaller messages can be processed at the same time, the parallel processing of each smaller message determining a quantity of the respective product that must be moved to the sales floor to satisfy at least one restocking rule given the quantities of the product on the sales floor in the smaller message and storing the quantity in a database.

20 Claims, 6 Drawing Sheets

(56) References Cited

U.S. PATENT DOCUMENTS

| | | | |
|---|---|---|---|
| 2007/0083442 A1* | 4/2007 | Peters | G06Q 10/0637 |
| | | | 705/7.36 |
| 2009/0204512 A1 | 8/2009 | Connell, II et al. | |
| 2010/0138037 A1 | 6/2010 | Adelberg et al. | |
| 2010/0138281 A1 | 6/2010 | Zhang et al. | |
| 2010/0161435 A1 | 6/2010 | Shimizu et al. | |
| 2013/0339083 A1 | 12/2013 | Baier et al. | |
| 2014/0100769 A1 | 4/2014 | Wurman et al. | |
| 2014/0156348 A1 | 6/2014 | Sinkel | |
| 2014/0316875 A1 | 10/2014 | Tkachenko et al. | |
| 2014/0344118 A1 | 11/2014 | Parpia et al. | |
| 2015/0178671 A1* | 6/2015 | Jones | G06Q 10/087 |
| | | | 705/28 |
| 2016/0203429 A1 | 7/2016 | Mellott et al. | |
| 2018/0137460 A1* | 5/2018 | Stiefel | G06Q 10/087 |
| 2018/0189725 A1* | 7/2018 | Mattingly | B65G 1/02 |

* cited by examiner

STORE WORKLOAD MANAGER

BACKGROUND

In retail stores, products are placed on display units on a sales floor so that shoppers can view and select items they wish to purchase. As shoppers make purchases, the display units become depleted of products making it harder for later shoppers to view the products or to select the products for purchase. Many stores maintain a backroom containing additional product inventory. As the display units become depleted, employees are assigned the task of bringing more units of the products to the sales floor from the backroom.

In large retail enterprises, there are thousands of stores each having thousands of products and each processing thousands of sales. Keeping track of the need for restocking in each of the products in each store on an enterprise level is computationally intensive.

The discussion above is merely provided for general background information and is not intended to be used as an aid in determining the scope of the claimed subject matter. The claimed subject matter is not limited to implementations that solve any or all disadvantages noted in the background.

SUMMARY

A method receives store inventory batch updates from a plurality of retail stores and divides each batch update into a stream of smaller messages, each smaller message referring only to a single product and including the identifier for the retail store, the identifier for the product, the quantity of the product on the sales floor of the retail store and the quantity of the product in the backroom of the retail store. The stream of smaller messages are applied to parallel processing such that a plurality of smaller messages can be processed at the same time, the parallel processing of each smaller message determining a quantity of the respective product that must be moved to the sales floor to satisfy at least one restocking rule given the quantities of the product on the sales floor in the smaller message and storing the quantity in a database.

In a further embodiment, a method includes periodically receiving a stream of product presentation messages, each product presentation message comprising an identifier of a retail store, an identifier of a product, and at least one of a presentation minimum for the product in the retail store and a facing quantity for the product in the retail store. For each received product presentation message: store inventory data for the identified product is retrieved including a quantity of the product on a sales floor. The retrieved store inventory data is combined with the content of the product presentation message to form rule parameters and a plurality of restocking rules are executed based on the rule parameters to identify a respective quantity of the product that is to be moved to the sales floor to satisfy each respective restocking rule.

In a still further embodiment, a system includes a database storing database entries and a plurality of processors operating in parallel to perform processing steps that include receiving a first message indicating a first quantity of a product on a sales floor of a retail store and using the first quantity to determine a refill quantity of the product that must be added to the sales floor to satisfy a restocking rule. The quantity is stored together with an identifier for the restocking rule as a first entry in the database. A second message is received indicating a second quantity of the product on the sales floor and the second quantity is used to determine that no units of the product must be added to the sales floor to satisfy the restocking rule. The quantity of zero is stored together with the identifier for the restocking rule as a second entry in the database instead of deleting the first entry in the database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The embodiments described below provide systems and methods for assigning restocking tasks by utilizing continuously updated instore inventory levels. As items are purchased or moved from the backroom to the sales floor, the amount of a product needed on the sales floor changes. Multiple times per hour, each store creates a batch message that indicates all of the products that have undergone a change in inventory levels on the sales floor since the last batch message was sent. Batch messages from multiple stores are processed in parallel by one or more servers to convert each batch message into a stream of smaller messages where each smaller message contains information for a single product in a single store. By dividing the batch messages into smaller messages, the smaller messages can be processed in parallel. Each smaller message is processed by combining the inventory data of the message with presentation parameters for the product and store that were received in a separate stream of messages and stored in a database. The combined inventory and presentation parameter data is then used to initialize a set of rules in parallel and then the initialized rules are executed in parallel to identify how many units of the product are needed to satisfy each restocking rule. For each restocking rule that needs at least one unit to be moved to the sales floor, the number of units that are needed is written to a worklist together with an identifier for the product, an identifier for the store, and an identifier for the restocking rule. For restocking rules that are currently satisfied by the inventory on the sales floor, an entry is written to the worklist for the restocking rule, the product identifier and the store identifier indicating a quantity of zero for the product.

Because changes in the inventory of the products is done in parallel, the present embodiments provide an improvement in the computer technology of assigning restocking tasks by allowing restocking tasks to be set for thousands of stores containing thousands of separate products while constantly tracking the quantities of products on the sales floors of the stores.

Figure 1:
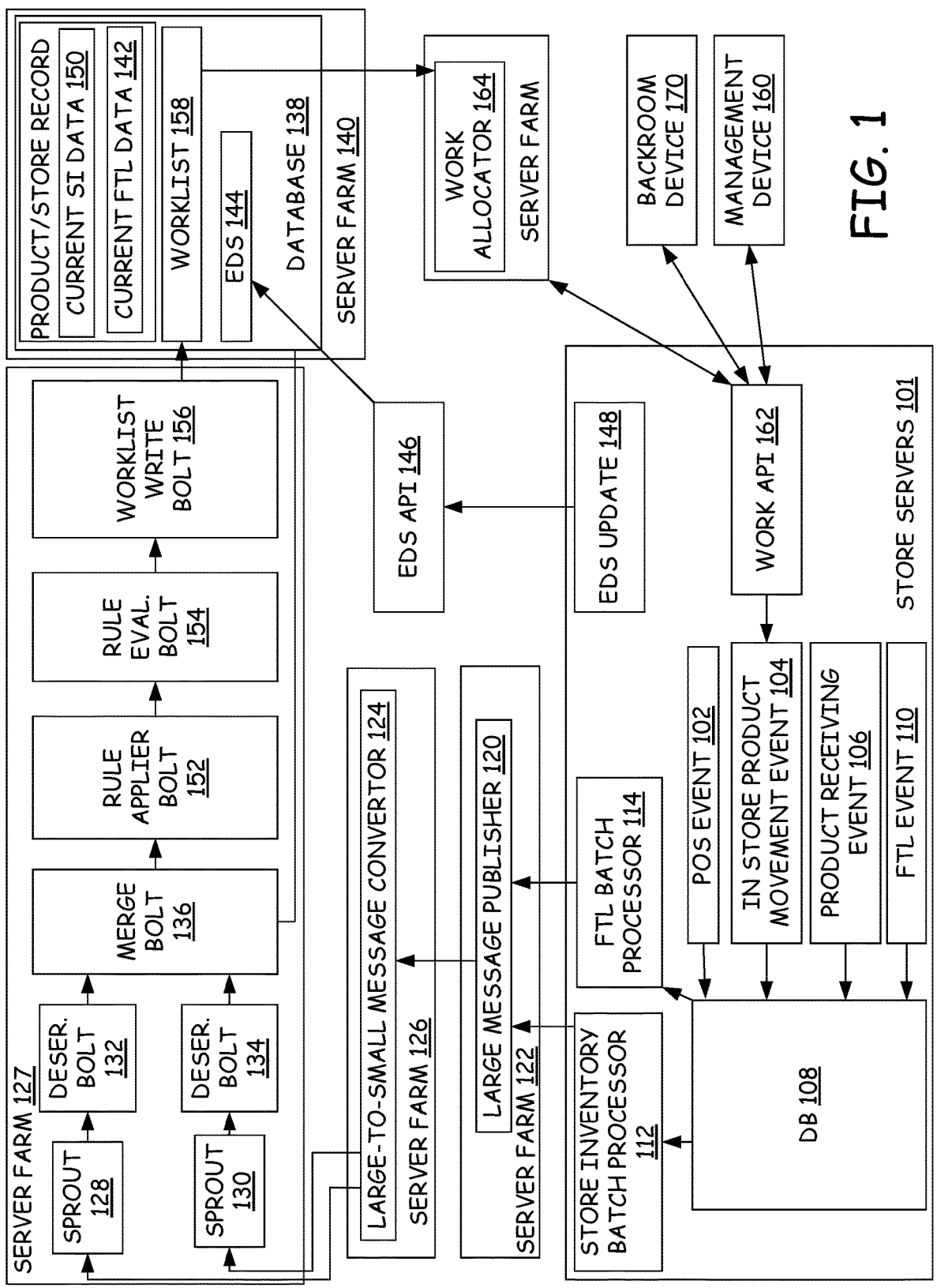
FIG. 1 provides a system diagram of elements used in accordance with one embodiment.
Figure 2:
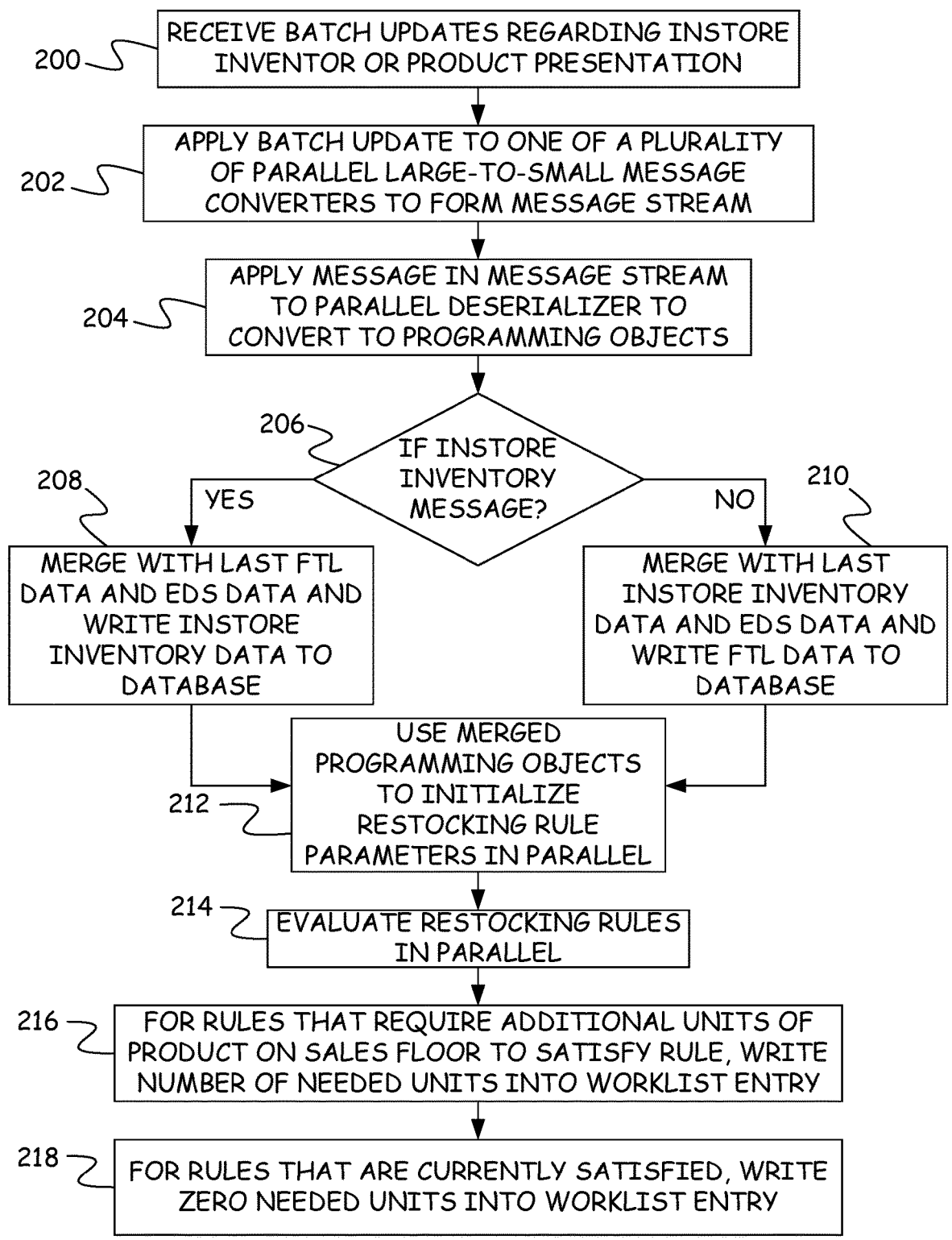
FIG. 2 provides a flow diagram of a method for processing instore inventory changes and presentation parameter changes to form worklist entries.

FIG. 1 provides a system 100 for monitoring inventory levels and generating restocking tasks for an enterprise of retail stores. FIG. 2 provides a flow diagram of a method for processing changes in sales floor inventory.

There are three major types of events that cause changes in inventory levels on a sales floor or a backroom of a retail store. The first is a point-of-sale event 102, which occurs when a user purchases an item or returns an item to the store. The second is an instore product movement event 104, which occurs when a product is moved from the backroom to the sales floor. A third type of event is a product receiving event 106 in which product is received from a distribution center or a manufacturer at the backroom. Each of events 102, 104 and 106 result in a change to an inventory database 108, which keeps a count of the number of units of each product on the sales floor and in the backroom of a store.

In addition to inventory events, presentation parameters events or Fill-To-Level events (FTL), referred to as FTL events 110, occur when the layout of products on the sales floor changes. In particular, the position and space occupied by products in the store changes frequently especially in areas of the store that carry seasonal merchandise. As a result, the number of items that can be placed on the sales floor changes from time-to-time as does the number of facing units of each product, which is the number of products that can be seen on the outside of a shelving unit when the shelving unit is fully stocked with the product. These presentation parameters or fill-to-levels (FTLs) are thus store specific and time specific. Changes to the presentation parameters due to FTL events 110 are also stored in inventory database 108.

Periodically, for example every minute, a store inventory batch processor 112 searches inventory database 108 for store inventory changes. Store inventory batch processor 112 identifies all products that have undergone a change in their inventory level in the backroom and/or on the sales floor in the store since the last batch message was constructed. Store inventory batch processor 112 then constructs a single batch message that identifies the store and includes information for each of the products that experienced an inventory change. This information includes an identifier for the product, the quantity of the product on the sales floor, the quantity of product needed on the sales floor to fully stock the sales floor, the quantity of product in the backroom, the maximum amount of product that can be stored in the backroom, and a pull or fill group that the product is assigned to.

FTL batch processor 114 also executes periodically, such as once per hour, and examines inventory database 108 to identify any products for which the product presentation parameters have been changed. For all products that have changed presentation parameters, FTL batch processor 114 generates a batch message that identifies the store and includes a separate entry for each product. Each entry includes an identifier for the product, the total capacity of the sales floor to hold the product, a presentation minimum for the product, a facing quantity for the product, a sales floor need quantity for the product, and the stock pull or fill group for the product.

Batch messages are sent by batch processors 112 and 114 to reduce the overhead incurred by store servers 101 in sending information to server farms 122 for processing. Store servers 101 have limited ability to scale during busy periods and the overhead associated with sending information for large numbers of products can overwhelm the store servers 101. To avoid this, the products are sent as batch messages, which require less overhead.

The batch messages are sent to a large message publisher 120, which is executed by a plurality of servers on server farm 122. At step 200 of FIG. 2, the batch updates are received by large message publisher 120 from a plurality of stores in the enterprise (only one store is depicted in the figures, but there are multiple stores in this embodiment). Large message publisher 120 directs the batch messages to one of a plurality of parallel large-to-small message converters 124 which are executed in parallel on servers on a server farm 126. At step 202, each large-to-small message converter receives a single batch update and converts that batch update into a stream of smaller messages where each smaller message is directed to a single product. Since the large-to-small message converters operate in parallel, batch messages from multiple different stores can be broken into smaller messages at the same time. In accordance with one embodiment, each smaller message contains the same content sent for each product in the batch message while also including the store identifier found in the header of the batch message.

In accordance with one embodiment, the streams of smaller messages are sent to a server farm 127 to be processed by a series of parallel processes. In accordance with one embodiment a Storm Topology is used to process the messages. In such a Topology, streams of messages are received on "Spouts" and individual processing steps are performed by application "Bolts."

For example, the stream of store inventory messages is sent to a message distributor or Spout 128 and the product presentation message stream is sent to a message distributor or Spout 130. Distributors 128 and 130 contain multiple processing elements and each processing element can receive a separate stream of messages. Thus, the parallel large-to-small message converters 124 can send their streams to parallel distributors 128 and 130.

Each distributor or Spout 128 and 130 distributes the small messages in their respective message stream to parallel deserializers 132 and 134. At step 204, each deserializer loads the text from a small message into one or more programming objects. For example, the information listed in the store inventory message is loaded into programming objects and the information in the FTL small message is loaded into programming objects.

Each of the parallel deserializers 132 and 134 then sends the programming object to a merge application or bolt 136. Merge bolt 136 consists of a set of parallel applications, such that each programming object can be processed in parallel. At step 206, each merge bolt 136 determines if the programming object is for an instore inventory message. If the programming object is for an instore inventory message, merge bolt 136 proceeds to step 208 where merge bolt 136 accesses database 138 housed on servers of a server farm 140 to retrieve current FTML data 142 and expected daily sales (EDS) 144 for the product. Expected daily sales 144 are stored in database 138 by an EDS processor 146 which receives EDS updates 148 from store servers 101. In accordance with one embodiment, the expected daily sales are simply set to the number of units of the product that were sold on the same day the previous week. Thus, at step 208, merge bolt 136 merges the received store inventory data programming object with product presentation programming object and expected daily sale programming object created from entries in database 138 to form a merged programming object. In addition, merge bolt 136 stores the values represented by the store inventory programming object in database 138 as current store inventory data 150.

If the programming object received by merge bolt 136 is not an instore inventory message at step 206, it is a product presentation programming object. As a result, at step 210, merge bolt 136 accesses database 138 to retrieve the latest store inventory data 150 and the EDS data 144 for the product and merges the last store inventory data and the EDS data with the product presentation data programming object to form a merged programming data object. In addition, merge bolt 136 writes the product presentation data (FTL data) to the database as current FTL data 142.

After steps 208 and 210, merge bolt 136 sends the merged programming object to a collection of parallel rule applier bolts 152, which each use the merged programming object to initialize rule parameters at step 212. In particular, merge bolt 136 calls a separate rule applier bolt 152 for each of a collection of restocking rules that have been defined for the enterprise. Each rule applier initializes its respective rule's parameters based on the merge programming object and then calls a respective rule evaluator bolt 154, which evaluates the restocking rule at step 214. Since each rule applier bolt 152 calls a separate rule evaluator bolt 154, the rule evaluator bolts execute in parallel for the single small message associated with a product.

Examples of restocking rules include: 1) keeping the sales floor quantity above a presentation minimum plus two times the expected daily sales, 2) keeping the sales floor quantity above the presentation minimum plus the expected daily sales, 3) keeping the sales floor quantity above the presentation minimum for the product, 4) keeping the sales floor quantity above a facing number plus the expected daily sales, and 5) keeping the sales floor quantity above the facing number. The facing number represents the number of product units for a distinct product type that span the front of the shelf area assigned to the product type and the presentation minimum for a product type is the facing number times the number of rows of product units behind the facing row that is considered to be presentation minimum.

The results of each rule evaluator are provided to one of a plurality of parallel worklist write bolts 156 that identify a quantity to write in a worklist 158 of database 138 based on the evaluation results from rule evaluator bolt 154. In particular, at step 216, worklist write bolt 156 writes a number of needed units into worklist entry 158 for rules that require additional units of products on the sales floor in order to satisfy the restocking rule. In particular, worklist bolt 156 writes the store identifier, an identifier for the restocking rule, an identifier for the fill group of the product, an identifier for the product itself, and the quantity needed to fully restock product at step 216. For rules that are currently satisfied by the quantity of the product on the sales floor at step 218, worklist bolt 156 writes a worklist entry that indicates that the quantity needed is zero. In particular, worklist bolt 156 writes the store identifier, the restocking rule identifier, the fill group identifier, the product identifier and a quantity of zero for each rule that is currently satisfied by the quantity of items on the sales floor.

A value of zero is written for restocking rules that are currently satisfied to avoid deleting entries from worklist 158. Deleting such entries is computationally expensive. By writing a value of zero for the restocking rule instead of deleting the entry, embodiments improve the operation of the computer because deletion operations are avoided for the thousands of products across thousands of stores found in a retail enterprise.

Since worklist 158 contains a current quantity needed for every product in every store according to every restocking rule used by the enterprise, it can be accessed at any time to identify the products that need to be restocked for a given store, restocking rule, and fill group.

Figure 3:
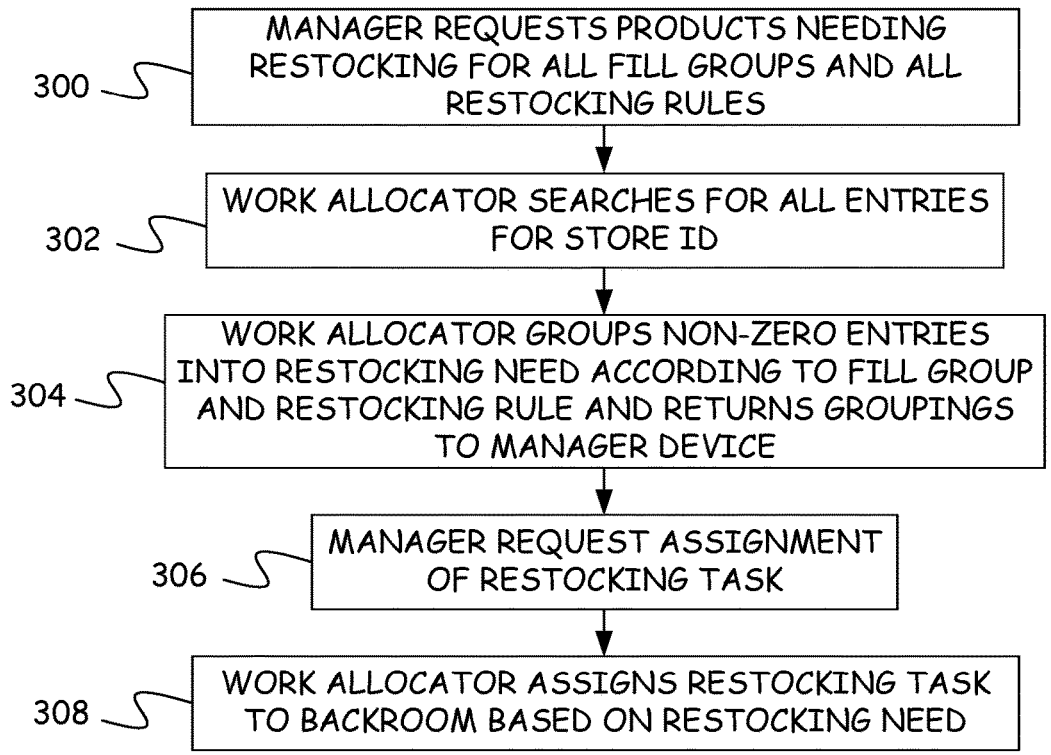
FIG. 3 provides a flow diagram of a method of assigning a restocking task.
Figure 4:
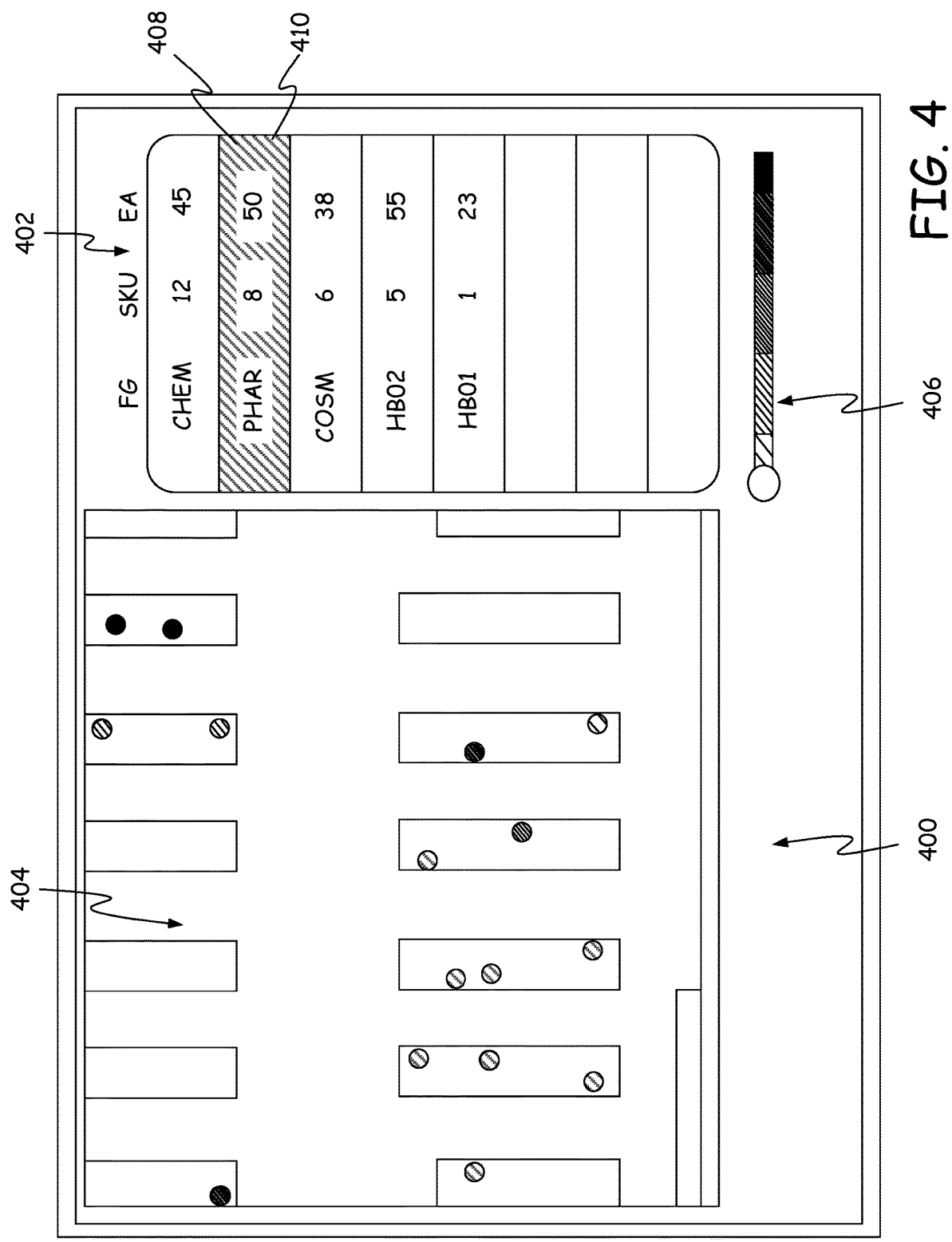
FIG. 4 provides an example of a user interface for viewing current inventory levels in a store.

FIG. 3 provides a method for a manager in a store to request the current restocking need for a fill group in a store according to one or more restocking rules. At step 300, the manager uses a management computing device 160 to request the identity of all products in the store that need additional units on the sales floor in order to satisfy a restocking rule. FIG. 4 provides an example user interface 400 of an application that upon opening places the request for all products needing restocking. This request is made to a Work API 162 on store servers 101, which forwards the request to a work allocator 164.

Work allocator 164 uses the store identifier provided in the request to retrieve all entries in work list 158 for the corresponding store at step 302. Work allocator 164 then groups products with non-zero needed quantities according to the fill group and restocking rules of the entries at step 304. Thus, all entries that have the same fill group and the same restocking rule would be placed in a single group. These groupings are then returned to management device 160 through Work API 162.

As shown in FIG. 4, based on the groupings that are returned, a user interface 400 is generated that includes a fill group list 402, a store map 404, and a slide control 406 for selecting different restocking rules. Slide control 406 depicts the restocking rules graphically with the restocking rule that is the least imperative on the left and the restocking rule that is the most imperative on the right. Store map 404 shows the location of products in the store that require restocking to satisfy at least the lowest level restocking rule selected by slide control 406. Thus, when slide control 406 is all the way to the left, any product that needs restocking according to any restocking rule is shown on store map 404. As slide control 406 is moved to the right, products that only need restocking to satisfy the least imperative restocking rules are removed from map 404. When slide control 406 is all the way to the right, only those products that need restocking to satisfy the most imperative restocking rule are shown.

Fill group list 402 includes a list of all fill groups that have at least one product that needs restocking according to at least one restocking rule. Selecting a fill group in fill group list 402 changes the background color of the fill group. For example, in FIG. 4, fill group 410 has been selected and its background color has been changed to color 408. In addition, when a fill group is selected, the color of map flags associated with products in the fill group that require restocking for the restocking rules selected by slide control 406 are changed to the color of the selected fill group. This allows the user to see what products need to be restocked for a particular fill group and a selected set of restocking rules.

Figure 5:
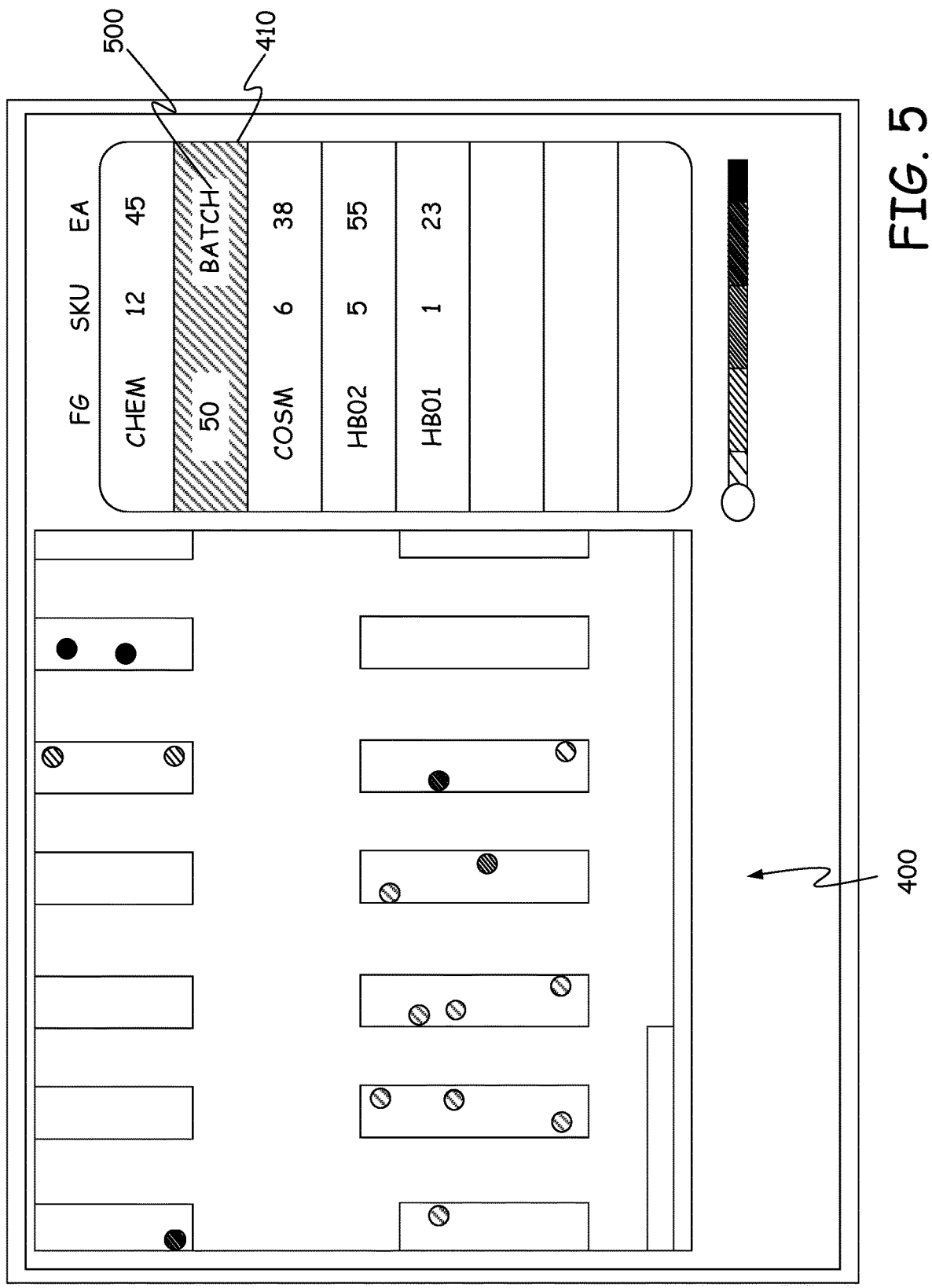
FIG. 5 provides a user interface for a manager to assign a restocking task for a fill group and restocking rule.

In addition to conveying the current restocking needs of products in a retail store, user interface 400 also allows a manager to request that a restocking task be set for a fill group. In the user interface of FIG. 5, a manager makes this request by first swiping a fill group entry, such as fill group entry 410, to the left to expose a restocking request control 500, which is designated as "BATCH". When a manager makes such a request at step 306 of FIG. 3, the request is sent through Work API 162 to work allocator 164, which assigns a restocking task for the fill group at step 308 to fully restock each of the products that require restocking according to at least one restocking rule. This restocking task is the sent to a backroom device 170 through work API 162 to instruct backroom employees to perform the restocking task.

Upon completion of the restocking task, backroom device 170 issues a task complete event that results in instore product movement event 104 being recorded in database 108 to reflect the movement of the products in the fill group from the backroom to the sales floor.

Figure 6:
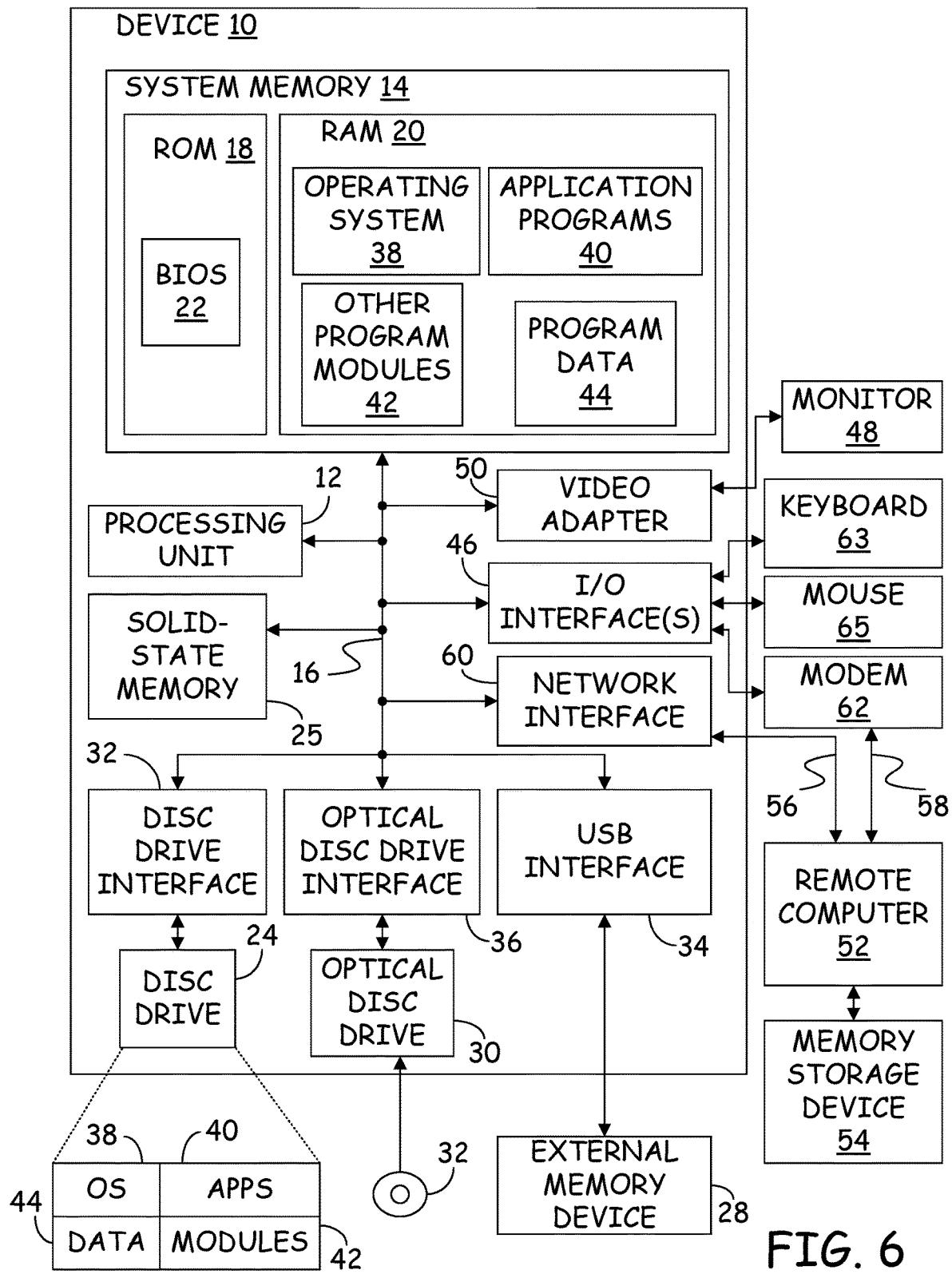
FIG. 6 is a block diagram of a computing system used in various embodiments.

FIG. 6 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the store inventory batch processor 112, FTL batch processor 114, large message publisher 120, large-to-small message convertor 124, sprouts 128 and 130, deserializer bolts 132 and 134, merge bolt 136, rule applier bolt 152, rule evaluator bolt 154, worklist write bolt 156, EDS API 146, EDS update 148, work API 162 and work allocator 164, for example. Program data 44 may include data such as data in database 138 and database 108, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 6. The network connections depicted in FIG. 6 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 6 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method for constant updating of restocking needs, the method comprising:
   receiving store inventory batch updates from a plurality of retail stores, each store inventory batch update comprising an identifier for a respective retail store, identifiers for a plurality of products in the respective retail store, a quantity of each of the plurality of products on a sales floor of the respective retail store and a quantity of each of the plurality of products in a backroom of the respective retail store;

dividing each batch update into a stream of smaller messages, each smaller message referring only to a single product and including the identifier for the retail store, the identifier for the product, the quantity of the product on the sales floor of the retail store and the quantity of the product in the backroom of the retail store; and applying the stream of smaller messages to parallel processing such that a plurality of smaller messages can be processed at the same time, the parallel processing of each smaller message determining a quantity of the respective product that must be moved to the sales floor to satisfy at least one restocking rule given the quantities of the product on the sales floor in the smaller message and storing the quantity in a database.

2. The computer-implemented method of claim 1 wherein parallel processing a smaller message comprises, forming a programming object that includes the quantity of product on the sales floor, the quantity of product in the back room and presentation parameters for the product in the retail store, the presentation parameters comprising a facing quantity of the product in the retail store and a presentation minimum of the product in the retail store.

3. The computer-implemented method of claim 2 wherein the presentation parameters are retrieved from a database.

4. The computer-implemented method of claim 2 wherein parallel processing the smaller message further comprises applying the programming object to a plurality of parallel rule initializers, wherein each rule initializer is associated with a respective restocking rule and wherein each rule initializer uses the programming object to set values of parameters used by the respective restocking rule.

5. The computer-implemented method of claim 4 wherein parallel processing the smaller message further comprises executing the restocking rules in parallel using the values of the respective parameters set by the respective rule initializers.

6. The computer-implemented method of claim 5 wherein for each restocking rule that indicates that additional inventory is needed on the sales floor to satisfy the restocking rule, storing an identifier for the restocking rule, the identifier for the product, the identifier for the retail store and the quantity of units needed to be moved to the sales floor in a database.

7. The computer-implemented method of claim 6 wherein for each restocking rule that indicates that no additional inventory is needed on the sales floor to satisfy the restocking rule, storing an identifier for the restocking rule, the identifier for the product, the identifier for the retail store and a quantity of zero units needed to be moved to the sales floor in the database.

8. A system comprising:
a batch processor providing batch inventory messages, each batch inventory message comprising a store identifier and a plurality of products;
a large-to-small message convertor receiving the batch inventory messages and for each batch inventory message, forming a small message for each product in the batch inventory message, each small message containing the store identifier of the batch inventory message;
a plurality of parallel small message processors that process at least two of the small messages from the large-to-small message convertor in parallel, wherein the processing of a small message comprises determining a quantity of the product in the small message that must be moved to a sales floor of a store represented by the store identifier.

9. The system of claim 8 wherein the plurality of parallel small message processors comprises parallel deserializers that form programming objects from the small messages.

10. The system of claim 9 wherein the plurality of parallel small message processors comprises parallel rule initializers, wherein each rule initializer is associated with a respective restocking rule and wherein each rule initializer uses a respective one of the programming objects to set values of parameters used by the respective restocking rule.

11. The system of claim 10 wherein the plurality of parallel small message processors comprises a plurality of parallel rule evaluators that each evaluate a respective restocking rule using the values of the respective parameters set by the respective rule initializers.

12. The system of claim 11 further comprising a plurality of worklist writers that each receive a respective number of units of a respective product to be restocked from a respective rule evaluator and that write the number of units to a common worklist.

13. The system of claim 12 wherein at least one of the worklist writers writes a value of zero for the number of units.

14. The system of claim 9 further comprising a merger that merges second programming objects with the programming objects from the small messages.

15. A computer-implemented method comprising:
receiving store inventory batch updates from a plurality of retail stores, each store inventory batch update comprising an identifier for a respective retail store, identifiers for a plurality of products in the respective retail store, and a quantity of each of the plurality of products on a sales floor of the respective retail store;
dividing each batch update into a stream of smaller messages, each smaller message referring only to a single product and including the identifier for the retail store, the identifier for the product, and the quantity of the product on the sales floor of the retail store; and
applying the stream of smaller messages to parallel processing such that a smaller message is applied to multiple rules in parallel to determine a quantity of the respective product that is to be moved to the sales floor.

16. The computer-implemented method of claim 15 wherein parallel processing a smaller message comprises forming a programming object that includes the quantity of product on the sales floor.

17. The computer-implemented method of claim 16 wherein parallel processing the smaller message further comprises applying the programming object to a plurality of parallel rule initializers, wherein each rule initializer is associated with a respective rule and wherein each rule initializer uses the programming object to set values of parameters used by the respective rule.

18. The computer-implemented method of claim 17 wherein parallel processing the smaller message further comprises executing the rules in parallel by applying the values of the respective parameters set by the respective rule initializers to respective parallel rule evaluators.

19. The computer-implemented method of claim 18 wherein parallel processing the smaller message further comprises applying the quantities output by the rule evaluators to parallel writers that write to a worklist.

20. The computer-implemented method of claim 19 wherein when a rule evaluator indicates that no units of a product is to be moved to the sales floor, the respective parallel writer writes a value of zero to the worklist.

\* \* \* \* \*